United States Patent
Rocks et al.

(10) Patent No.: US 6,852,415 B2
(45) Date of Patent: Feb. 8, 2005

(54) CASTING COMPOUND BASED ON THERMOSETTING EPOXY RESINS

(75) Inventors: Jens Rocks, Zürich (CH); Martin Halter, Küssnacht (CH)

(73) Assignee: ABB Research LTD, Zurich (CH)

( * ) Notice: Subject to any disclaimer, the term of this patent is extended or adjusted under 35 U.S.C. 154(b) by 55 days.

(21) Appl. No.: 10/345,203

(22) Filed: Jan. 16, 2003

(65) Prior Publication Data

US 2003/0166747 A1 Sep. 4, 2003

(30) Foreign Application Priority Data

Jan. 28, 2002 (EP) .............................................. 02405047

(51) Int. Cl.[7] .......................... B32B 27/38; B32B 27/04; C08L 63/00; H01B 3/40; B05D 3/02
(52) U.S. Cl. .................... 428/413; 428/297.4; 428/396; 523/462; 156/330; 174/1; 427/58; 427/386
(58) Field of Search ................................ 523/400, 440, 523/462; 428/413, 414, 415, 416, 417, 418, 297.4, 375, 396; 156/330; 427/58, 386; 174/1

(56) References Cited

U.S. PATENT DOCUMENTS

| | | | |
|---|---|---|---|
| 2,884,406 A | 4/1959 | Wegler et al. | |
| 2,921,037 A | 1/1960 | Andres et al. | |
| 2,951,822 A | 9/1960 | Reinking et al. | |
| 3,244,731 A | 4/1966 | Winfield et al. | |
| 3,993,744 A | 11/1976 | Cella et al. | |
| 3,993,745 A | 11/1976 | Cella et al. | |
| 4,176,176 A | 11/1979 | Cella et al. | |
| 4,713,137 A | 12/1987 | Sexton | |
| 5,556,437 A | * 9/1996 | Lee et al. | ...................... 51/298 |
| 2004/0048048 A1 | * 3/2004 | Lamotte et al. | .......... 428/195.1 |

FOREIGN PATENT DOCUMENTS

| | | |
|---|---|---|
| CH | 19828248 A1 | 12/1999 |
| EP | 0148117 B1 | 1/1989 |
| WO | 91/05023 | 4/1991 |
| WO | 99/67315 | 12/1999 |

OTHER PUBLICATIONS

F. Lohse, "Epoxid–Harze", Houben–Weyl Bd ZOE (1987), pp. 1926–1929.

* cited by examiner

*Primary Examiner*—Michael J. Feely
(74) *Attorney, Agent, or Firm*—Burns, Doane, Swecker & Mathis, L.L.P.

(57) ABSTRACT

The curable casting compound comprises an epoxy resin having at least one aminoglycidyl group in the molecule, a curative, and a fluorosurfactant. In the manufacture of products based on this casting compound, the shaping and curing operation can be shortened considerably.

29 Claims, No Drawings

CASTING COMPOUND BASED ON THERMOSETTING EPOXY RESINS

FIELD OF THE INVENTION

The invention relates to a casting compound based on thermosetting epoxy resins. Casting compounds and casting resin systems based on thermosetting epoxy resins are known per se. Casting resin systems of this kind are employed diversely, for example, as coatings, adhesives or matrix resins for fiber reinforced plastics. In the electrical engineering segment, and particularly in switchgear construction, epoxy resins possess substantial importance as insulating materials. Such epoxy resin systems also find further applications as insulating materials in the production of measuring transducers, bushings, circuit breakers, dry-type transformers, and electrical machinery, in power electronics, in microelectronics, and in automation engineering.

Curable casting compounds based on thermosetting epoxy resins are generally composed of epoxy resin, curative, accelerator, filler, and further additives. In electrical engineering, the epoxy resin systems used are at present primarily systems filled with particles. Systems of this kind, with a filling level of up to 70% by weight, are known per se, with preferred fillers used being $SiO_2$, $Al_2O_3$, wollastonite ($CaSiO_3$) and/or $CaMg(CO_3)_2$ (dolomite).

In order to achieve economic mold occupancy times when the resin system is being cured in the course of shaping, accelerators are used, which accelerate the crosslinking reaction between the epoxy resin and the curative. This results in shorter cure and press times. There is therefore a need for casting compounds which have extremely short cure and press times.

BACKGROUND OF THE INVENTION

Examples of known, typical accelerators for curable casting compounds based on thermosetting epoxy resins are benzyldimethylamine and 1-methylimidazole. However, the activity of these accelerators for casting compounds based on epoxy resins which contain at least one aminoglycidyl group is low.

SUMMARY OF THE INVENTION

It has now been found that a curable casting compound based on epoxy resins having at least one aminoglycidyl group in the molecule exhibits an unexpectedly increased cure rate if said casting compound comprises (i) an epoxy resin having at least one aminoglycidyl group in the molecule, (ii) a curative, and (iii) a fluorosurfactant. The casting compound may comprise further additives. In comparison with the activity of conventional accelerators, the gel time of such a casting compound is considerably shortened, down to half the standard gel time, for example. Consequently, cycle times are much shorter and the economic efficiency of the production process is significantly increased.

A surfactant is generally composed of a hydrophobic moiety and a hydrophilic moiety. The hydrophobic moiety is generally a hydrocarbon, such as a fatty acid residue, for example; the hydrophilic moiety is anionic, cationic, nonionic or amphoteric. In accordance with the present invention, a surfactant is used which has a partly or fully fluorinated hydrocarbon radical as its hydrophobic radical and an anionic, cationic, nonionic or amphoteric radical as its hydrophilic moiety. A surfactant of this kind is termed a fluorosurfactant. Fluorosurfactants are known per se and are described, for example, in U.S. Pat. No. 4,176,176, U.S. Pat. No. 3,993,745, and U.S. Pat. No. 3,993,744. The content of these patents is incorporated by reference. Fluorosurfactants of this kind are available commercially, for example, under the brand names ZonyL® and Fluorad®.

The present invention is defined in the claims. The present invention relates in particular to a curable casting compound comprising an epoxy resin and a curative and, where appropriate, further additives, characterized in that the casting compound comprises at least (i) an epoxy resin which contains at least one aminoglycidyl group in the molecule, (ii) a conventional curative or mixture of such curatives, and (iii) a fluorosurfactant.

The casting compound of the invention is suitable for use as a coating, as an adhesive, as a matrix resin for fiber reinforced plastics, in the electrical engineering segment, particularly in switchgear construction, as a construction material or as an insulating material for producing measuring transducers, bushings, circuit breakers, dry-type transformers, and electrical machinery, and can also be used in power electronics, in microelectronics, and in automation engineering.

In this sense the present invention relates to the use of the casting compound of the invention as a coating, as an adhesive, as a matrix resin for fiber reinforced plastics, as a construction material or as an insulating material in the electrical engineering field.

The invention further relates to the coatings, adhesives, fiber reinforced plastics, construction components, and electrical insulation systems produced from the casting compounds of the invention.

The invention additionally relates to a process for preparing the casting compounds of the invention.

The fluorosurfactant that is to be used is a critical constituent of the present invention. The fluorosurfactant corresponds preferably to the general formula (I)

  (I)

in which the hydrophobic radical corresponds to the general formula (Ia):

  (Ia)

and A denotes the hydrophilic moiety of the surfactant, where

R and $R_1$ independently of one another denote hydrogen or fluorine and x denotes an integer 2–12, preferably 2–10, more preferably 3–8, and very preferably 3–5.

Where the hydrophobic radical of the formula (I) denotes a partly fluorinated hydrocarbon radical, then preferably half and more preferably about 80% of the substituents R and $R_1$ that are present, independently of one another, denote fluorine. Preference is given to perfluorinated radicals of the general formula (I), i.e., to radicals in which all substituents R and $R_1$ denote fluorine.

The hydrophilic component A of the compound of the general formula (1) corresponds preferably to the general formula (Ib):

  (Ib)

in which $R_2$ and $R_3$ independently of one another denote hydrogen or fluorine, preferably hydrogen, y denotes zero or an integer in the range from 1 to 10, preferably zero or from 1 to 6, and in particular zero, 1, 2, 3 or 4, and B denotes hydrogen or an anionic, cationic or amphoteric radical.

Anionic radicals B of the formula (Ib) are, for example, —C(O)OH, —P(O)OH, —P(O)(OH)$_2$, —S(O)OH, —S(O)$_2$OH, or a salt thereof, or —(CH$_2$)$_z$C(O)OH, —CH$_2$)$_z$O—P(O)OH, —(CH$_2$)$_z$O—P(O)(OH)$_2$, —(CH$_2$)$_z$—OS(O)OH, —(CH$_2$)$_z$O—S(O)$_2$OH, in which z denotes 1, 2, 3 or 4, or a salt thereof, preferably a salt of sodium or potassium or ammonium.

Cationic radicals B of the formula (Ib) are, for example, CH$_2$C(O)NHCH$_2$CH$_2$[NH(CH$_3$)CH$_2$CH$_2$NH(CH$_3$)]$^{2+}$ (anion)$_2$, and analogous compounds.

Nonionic radicals A of the formula (I) arise in particular if B in the formula (Ib) denotes hydrogen. Further examples are compounds in which B denotes an acyl radical, such as [—(O)C—C$_n$H$_{2n+1}$], for example, where n denotes a number 1–22. An acyl radical of this kind may carry further substituents which where appropriate modify the nonionic character, such as hydroxyl, amino or carboxyl, for example. Numerous further combinations are conceivable.

Amphoteric radicals are those where B in the formula (Ia) denotes, for example,
—CH$_2$CHO(O)CCH$_2$CH$_2$N$^+$(CH$_3$)$_2$CH$_2$COO$^-$, or
—CH$_2$CHOCH$_2$C(O)NHCH$_2$CH$_2$N$^+$(CH$_3$)$_2$CH$_2$COO$^-$, and also further such combinations of cationic and anionic groups in the same molecule.

Preference is given to nonionic compounds of the formula (1), especially compounds in which B denotes hydrogen.

Preference is given in particular to nonionic compounds of the formula (II):

$$F—(CF_2—CF_2)_x—CH_2—CH_2O—(CH_2—CH_2O)_y—H \quad (II)$$

in which x and y are as defined above.

The fluorosurfacant [component (iii)] is preferably used in amounts (calculated based on the fluorosurfactant alone) of 0.1–5.0% by weight, more preferably 0.5–3.0% by weight, very preferably about 1.0–1.5% by weight, based in each case on the total weight of components (i) and (ii), in other words based on the total weight of the epoxy resin and curative that are present in the casting compound.

The fluorosurfacant may be in liquid or pastelike form, may be in the form of a solid or may be in solution in an appropriate solvent, and may be used directly in that form. It is notable that the fluorosurfactant, depending on its chemical structure, is able to react both with the epoxy resin and with the curative. In view of the small amounts employed, the fluorosurfactant may surprisingly also be used as an aqueous solution, in a concentration of 40% by weight, for example, despite the fact that the presence of water is undesirable per se in the processing of epoxy resins.

Preferred epoxy resins are those of component (i) having good electrical properties, preferably aromatic and/or cycloaliphatic epoxy resins, where the epoxy resin contains at least one aminoglycidyl group in the molecule. Epoxy resins of this kind which are used in the electrical industry are known per se from the literature and are described, for example, in WO 99/67315.

Preference is given to epoxy resins having on average more than one epoxide group per molecule, of which at least one is in the form of an aminoglycidyl group. Particularly suitable aminoglycidyl compounds are N,N-diglycidylaniline, N,N-diglycidyltoluidine, N,N,N',N'-tetraglycidyl-1,3-diaminobenzene, N,N,N',N'-tetraglycidyl-1,4-diaminobenzene, N,N,N',N'tetraglycidylxylylenediamine, N,N,N',N'-tetraglycidyl-4,4'-diaminodiphenylmethane, N,N,N',N'-tetraglycidyl-3,3'-diethyl-4,4'diaminodiphenylmethane, N,N,N',N'-tetraglycidyl-3,3'-diaminodiphenylsulfone, N,N'-dimethyl-N,N'-diglycidyl-4,4'-diaminodiphenylmethane, N,N,N',N'tetraglycidyl-α,α'-bis(4-aminophenyl)-p-diisopropylbenzene, and N,N,N',N'tetraglycidyl-α,α'-bis(3,5-dimethyl-4-aminophenyl)-p-diisopropylbenzene. Preferred aminoglycidyl compounds are:

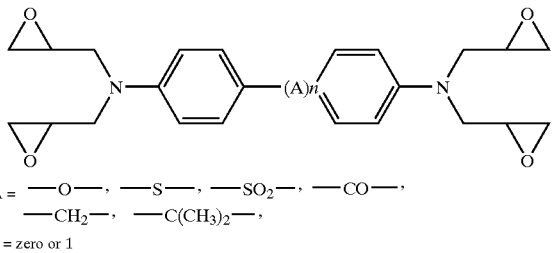

(I)

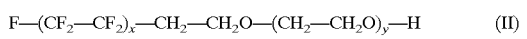

n = zero or 1 and also

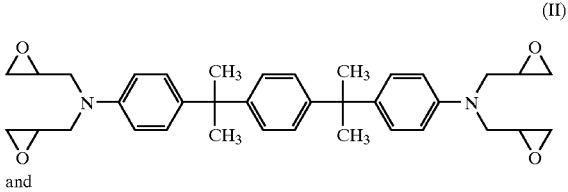

(II)

and

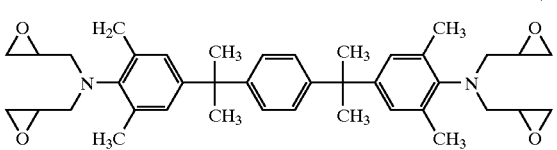

(III)

Other suitable polyglycidyl compounds of aminophenols include O,N,N-triglycidyl-4-aminophenol, O,N,N-triglycidyl-3-aminophenol, and 2,2-(N,N-diglycidyl-4-aminophenyl-1,4'-glycidyloxyphenyl)propane. Further aminoglycidyl compounds which can be used in accordance with the invention are described in Houben-Weyl, Methoden der Organischen Chemie, Volume E20, Makromolekulae Stoffe [Macromolecular substances], Georg Thieme Verlag, Stuttgart, 1987, pages 1926–1928. The trifunctional and tetrafunctional aminoglycidyl compounds can be prepared, for example, by the processes described in U.S. Pat. No. 2,884,406, U.S. Pat. No. 2,921,037, and U.S. Pat. No. 2,951,822, and also by the processes described in EP 0 148 117.

Together with the aminoglycidyl compounds it is possible to use other polyepoxides as well, whose fraction in the epoxy resin mixture can be between 1 mol % and not more than 75 mol %, preferably between 10 and 50 mol %. These other polyepoxides may be aliphatic, cycloaliphatic, aromatic or heterocyclic, and may also contain substituents such as halogens, hydroxyl, ether radicals or other radicals. They are generally based on the known polyhydric phenols which are adequately described in the literature, such as bisphenol A, bisphenol F, and bisphenol S, for example, on epoxidized phenol or cresol novolacs, and on cycloaliphatic epoxy resins. Examples of aliphatic epoxy resins are epoxyalkanes, diglycidyl ethers of diols, and cis/trans 1,4- cyclohexanedimethanol diglycidyl ethers. Examples of cycloaliphatic epoxy resins are cyclohexene oxide, 4-vinyl-1-cyclohexene diepoxide, and 3,4-epoxycyclohexylmethyl 3,4-epoxy-cyclohexanecarboxylate.

The glycidyl compounds mixed in are preferably those which contain at least two 1,2-epoxide groups in the molecule. It is preferred to mix in a mixture of such polyglycidyl compounds: for example, a mixture of diglycidyl and triglycidyl compounds. Generally speaking, a selection appropriate for the intended application can be made from the known glycidyl compounds, this constituting an optimization problem for the skilled worker.

As curative use is made of conventional hydroxyl-containing compounds and/or carboxyl-containing polymers, especially carboxyl-terminated polyesters and/or carboxyl-containing acrylate and/or methacrylate polymers and/or carboxylic anhydrides.

Suitable curatives are cyclic anhydrides of aromatic, aliphatic, cycloaliphatic, and heterocyclic poly-carboxylic acids. Particularly suitable anhydrides of aromatic polycarboxylic acids are phthalic anhydride and its substituted derivatives, benzene-1,2,4,5-tetracarboxylic dianhydride (pyromellitic dianhydride) and its substituted derivatives, and also compounds of the formula (IV):

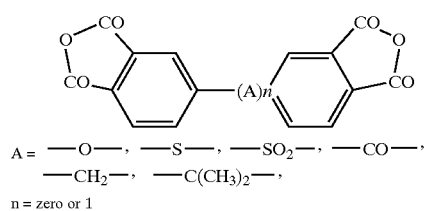

A = —O—, —S—, —SO$_2$—, —CO—,
—CH$_2$—, —C(CH$_3$)$_2$—, n = zero or 1

Examples of suitable anhydride curatives are phthalic anhydride, 4-methylphthalic anhydride, 3,6-dichlorophthalic anhydride, 4,5-dichlorophthalic anhydride, 3,6-difluorophthalic anhydride, tetrabromo-, tetrachloro-, and tetrafluorophthalic anhydride, 3-nitro- and 4-nitrophthalic anhydride, benzene-1,2,4,5-tetracarboxylic dianhydride (pyromellitic dianhydride), 3,3',4,4'-benzophenonetetracarboxylic dianhydride, 2,2-bis(3,4-benzenedicarboxyphenyl)propane dianhydride, 2,2-bis(2,3-benzenedicarboxyphenyl)propane dianhydride, 2,2-bis(4,4-benzenedicarboxylic anhydride)perfluoropropane, bis(3,4-dicarboxyphenyl) ether dianhydride, bis(3,4-dicarboxyphenyl)methane dianhydride, 2,2',3,3-biphenyltetracarboxylic dianhydride, and 3,3',4,4'-biphenyltetracarboxylic dianhydride. The aromatic carboxylic anhydrides may contain additional functional groups. Examples are benzene-1,2,4-tricarboxylic anhydride (trimellitic anhydride), 3-hydroxyphthalic anhydride, 3- and 4-maleimidophthalic anhydride, and 2-sulfobenzoic cycloanhydride. Also suitable are derivatives of trimellitic anhydride such as the bistrimellitic anhydride of neopentyl glycol, for example.

Also suitable are aromatic carboxylic anhydrides with fuzed ring systems, such as 1,8-naphthoic anhydride, naphthalene-1,4,5,8-tetracarboxylic dianhydride, naphthalene-1,2,5,6-tetracarboxylic dianhydride, naphthalene-3,4,5,8-tetracarboxylic dianhydride, naphthalene-2,3,6,7-tetracarboxylic dianhydride, 3,4,9,10-perylenetetracarboxylic dianhydride, and their halogen and nitro derivatives.

Particular preference is given to maleic anhydride. It can be used as sole curative for aminoglycidyl resins and for mixtures thereof with other epoxy resins. Maleic anhydride is very readily soluble in the aminoglycidyl resins. In mixtures with other anhydrides, maleic anhydride acts as a solubilizer and increases the dissolution rate. The cured resins possess outstanding thermal stability and high glass transition temperatures. Other preferred anhydrides are derivatives of maleic anhydride, such as methylmaleic and dimethylmaleic anhydride, phenylmaleic and diphenylmaleic anhydride, bromomaleic anhydride, dichloromaleic anhydride, and related maleic anhydrides. Some cycloaliphatic dicarboxylic anhydrides, as may be used in accordance with the invention, have the advantage that they are liquid or low-melting, such as cis-cyclohexane-1,2-dicarboxylic anhydride, 4-methylcyclohexane-1,2-dicarboxylic anhydride, methylcyclohexene-4,5-dicarboxylic anhydrides, and bicyclic compounds such as methyl-5-norbornene-2,3-dicarboxylic anhydride and its isomeric mixtures (NADIC methyl anhydrides). Other suitable monocyclic and bicyclic cycloaliphatic dicarboxylic anhydrides are 1,2,3,4-cyclobutanetetracarboxylic dianhydride, cis-1,2,3,4-cyclopentanetetracarboxylic dianhydride, trans-cyclohexane-1,2-dicarboxylic anhydride, 1-cyclopentene-1,2-dicarboxylic anhydride, cis-4-cyclohexene-1,2-dicarboxylic anhydride, cis-5-norbornene-endo-2,3-dicarboxylic anhydride (NADIC anhydrides), bicyclo[2.2.2]oct-7-ene-2,3,5,6-tetra-carboxylic dianhydride, and 1,4,5,6,7,7-hexachloro-5-norbornene-2,3-dicarboxylic anhydride (HET anhydride).

Examples of heterocyclic carboxylic anhydrides which can be used in accordance with the invention are pyridine-2,3-dicarboxylic anhydride, pyridine-3,4-di-carboxylic anhydride, pyrazine-2,3-dicarboxylic anhydride, pyrazine-2,3,5,6-tetracarboxylic dianhydride, thiophene-2,3,4,5-tetracarboxylic dianhydride, tetrahydrofuran-2,3,4,5-tetracarboxylic dianhydride, isatoic anhydride, and N-methylisatoic anhydride.

The carboxylic anhydride curing agent used is employed in conventional concentrations in the range from 0.2 to 1.2 equivalents of the anhydride groups per epoxide equivalent. The curable mixtures of the invention may comprise additives, such as plasticizers, elasticizers, fillers, reinforcing fibers, and also flame retardants and/or colorants.

For preparing the casting compound of the invention the epoxy resin [component (i)], the curative [component (ii)], the fluorosurfactant [component (iii)], and any additives present, such as fillers and further additives, can be mixed in any order. Component (iii) can be premixed with one or both components (i) and (ii) and then the finished mixture or casting compound can be prepared. It is preferred to mix component (iii) first with the curative, before then using them to prepare the casting compound. Premixing has a positive effect on the distribution of the fluorosurfactant in the casting compound and thus also on the physical and mechanical properties of the cured product.

The casting compound of the invention is cured preferably at temperatures in the range from 50° C. to 150° C., more preferably in the range from 80° C. to 120° C. However, it is generally also possible to cure the casting compound of the invention at room temperature, in which case a degree of cure of more than 90% [measured by means of thermal analysis (DSC)] is attained within a period ranging from a few days to a few weeks.

The casting compounds employed are preferably those which include at least one filler. Such fillers are added in conventional amounts and are preferably quartz flour, wollastonite, alumina and/or dolomite in various conventional grinds. The fillers have preferably been silanized in order to ensure optimum chemical attachment of the particles in the resin matrix.

The casting compound of the invention is suitable for use as a coating, as an adhesive, as a matrix resin for fiber reinforced plastics, and can also be used in the electrical engineering segment, particularly in switchgear construction, as a construction material or as an insulating material in the production of electrical insulation systems, e.g., as rod, combination, and bell type insulators, for pin insulators in the medium tension segment, in the production of measuring transducers, bushings, power switches, dry-type transformers, and electrical machinery, in power electronics, in microelectronics, and in automation engineering. The casting compounds of the invention may further be used as coating materials for transistors and other semiconductor elements and for impregnating electrical components. The casting compound of the invention may likewise be employed as corrosion protection for metallic components, e.g., for bridges and industrial plant. The following examples illustrate the invention.

EXAMPLE 1

A curable epoxy resin mixture of the commercial resin system Araldit MY721 (manufacturer: Vantico), consisting of 100 parts of N,N,N',N'-tetraglycidyl-4,4'-diaminodiphenylmethane (TGDDM), 48 parts of maleic anhydride (MA; Fluka), and 32 parts of cis-hexahydrophthalic anhydride (HHPA; Fluka) was introduced initially, the epoxy resin (TGDDM) being heated to 65° C. and then admixed with the two anhydride curatives (MA and HHPA). The components were mixed at room temperature using an Ultraturrax® mixer at 14 000 rpm and then degassed at 200–250 mbar for 3 minutes.

The gel times of the HTP mixtures were determined at 80° C. and 100° C. as follows: (a) without addition of a further component; (b) with addition of 3% by weight benzyldimethylamine (BDMA, curative, Ciba® DY062); and (c) with addition of 3% by weight Zonyl® FS300 (corresponding to about 1.2% by weight dry matter), i.e., a compound of the formula $F(CF_2-CF_2)_n-CH_2CH_2O(CH_2CH_2O)_yH$ in which x is on average in the range 3–8, in particular about 4–5, and y is on average in the range 1–3, and about 2. Zonyl® FS300 is an aqueous solution with a dry matter content of approximately 40% by weight.

The gel times of the mixtures (a), (b), and (c) were measured using a Bohlin Instruments CV075 rheometer. The gel point used was the intersection of the loss modulus and the storage modulus, corresponding to a phase angle of d(delta)=45', or tand=1. The results of the measurements are listed in Table 1.

There it is evident that by adding Zonyl® FS300, both at 80° C. and at 100° C., an average reduction of about 50% in the gelling times is obtained. The addition of 7% by weight of Zonyl® FS300 (about 3% by weight dry matter) gives similar results. In comparison, the commercial accelerator [experiment (b) with benzyldimethylamine] shows a reduction of 9–24%, which is much less relevant industrially.

TABLE 1

| | Gel time (sec) at 80° C. | Reduction in gel time (%) | Gel time (sec) at 100° C. | Reduction in gel time (%) |
|---|---|---|---|---|
| Experiment (a) | 3789 | — | 1405 | — |
| Experiment (b) | 2882 | 24 | 1277 | 9 |
| Experiment (c) | 1811 | 52 | 698 | 50 |

EXAMPLE 2

Similar results are obtained if the epoxy resin of Example 1 (TGDDM) is replaced by 100 parts each of (2a) N,N,N', N'-tetraglycidyl-3,3'-diethyl-4,4'-diaminodiphenylmethane, (2b) N,N,N',N'-tetraglycidyl-3,3'-diaminodiphenyl sulfone, or (2c) N,N'-dimethyl-N,N'-diglycidyl4,4'-diaminodiphenylmethane.

EXAMPLE 3

Similar results are obtained if the maleic anhydride curative component from Example 1 is replaced by 48 parts of (3a) methylmaleic anhydride, (3b) dimethylmaleic anhydride, (3c) phenylmaleic anhydride, and (3d) diphenylmaleic anhydride.

EXAMPLE 4

Similar results are obtained if the cis-hexahydrophthalic anhydride curative component is replaced by 32 parts of (4a) cis-cyclohexane-1,2-dicarboxylic anhydride, (4b) benzene-1,2,4,5-tetracarboxylic dianhydride, (4c) 3,3',4,4'-benzophenonetetracarboxylic dianhydride, (4d) 2,2-bis(3,4-benzenedicarboxyphenyl)propane dianhydride, or (4e) 3,3', 4,4'-biphenyltetracarboxylic dianhydride.

What is claimed is:

1. A curable casting compound comprising an epoxy resin, a curative, and optional additives, wherein the casting compound comprises at least (i) an epoxy resin which contains at least one aminoglycidyl group in the molecule, (ii) a conventional curative or a mixture of such curatives, and (iii) a fluorosurfactant of the following formula (1):

$$R-[C(R)(R_1)-C(R)(R_1)]_x-A \qquad (I)$$

in which: the radical of the following formula (Ia):

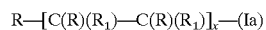

$$R-[C(R)(R_1)-C(R)(R_1)]_x- \qquad (Ia)$$

is a hydrophobic radical; R and $R_1$ independently of one another denote hydrogen or fluorine; and x denotes an integer of 2–12; the substituent A of the formula (I) corresponds to the following formula (Ib):

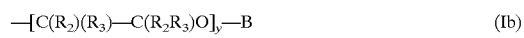

$$-[C(R_2)(R_3)-C(R_2R_3)O]_y-B \qquad (Ib)$$

in which: $R_2$ and $R_3$ independently of one another denote hydrogen or fluorine; y denotes zero or an integer from 1 to 10; B denotes at least one of hydrogen, an anionic radical, a cationic radical, and an amphoteric radical; wherein if B is hydrogen, y denotes an integer from 1 to 10.

2. The casting compound of claim 1, wherein in the hydrophobic radical of the formula (I) at least half of the substituents R and $R_1$ that are present, independently of one another, denote fluorine.

3. The casting compound of claim 2, wherein in the hydrophobic radical of the formula (I), at least 80% of the substituents R and $R_1$ that are present, independently of one another, denote fluorine.

4. The casting compound of claim 1, wherein the hydrophobic radical of the formula (I) is a perfluorinated radical.

5. The casting compound of claim 1, wherein the anionic radical B of the formula (Ib) denotes at least one of: —C(O)OH or a salt thereof, —P(O)OH or a salt thereof, —P(O)(OH)$_2$ or a salt thereof, —S(O)OH or a salt thereof, —S(O)$_2$OH or a salt thereof, —(CH$_2$)$_n$C(O)OH or a salt thereof, —(CH$_2$)$_z$O—P(O)OH or a salt thereof, —(CH$_2$)$_n$O—P(O)(OH)$_2$ or a salt thereof, —(CH$_2$)$_n$O—S(O)OH or a salt thereof, and —(CH$_2$)$_n$O—S(O)$_2$OH or a salt thereof; wherein z denotes a number of 1–4, and wherein said salts are preferably salts of sodium, potassium or ammonium.

6. The casting compound of claim 1, wherein the cationic radical B of the formula (Ib) denotes —CH$_2$C(O)NHCH$_2$CH$_2$[NH(CH$_3$)CH$_2$CH$_2$NH(CH$_3$)]$^{2+}$ (anion)$_2$.

7. The casting compound of claim 1, wherein B of the formula (Ib) is hydrogen.

8. The casting compound of claim 1, wherein B in the formula (Ib) denotes an amphoteric radical of the formula —$CH_2CH_2O(O)CCH_2CH_2N^+(CH_3)_2CH_2COO^-$, or of the formula —$CH_2CH_2OCH_2C(O)NHCH_2CH_2N^+(CH_3)_2CH_2COO^-$.

9. The casting compound of claim 1, wherein the fluorosurfactant corresponds to the compound of formula (II):

$$F—(CF_2—CF_2)_n—CH_2—CH_2O—(CH_2—CH_2O)_y—H \quad (II)$$

in which x denotes an integer of 2–12, preferably 2–10, more preferably 3–8, and very preferably 3–5, and y denotes zero or an integer from 1 to 9, preferably zero or from 1 to 6, and in particular zero, 1, 2, 3, or 4.

10. The casting compound of claim 1, which comprises the fluorosurfactant in an amount (calculated based on the fluorosurfactant alone) of 0.1–5.0% by weight, preferably 0.5–3.0% by weight, more preferably about 1.0–1.5% by weight, based in each case on the total weight of the epoxy resin and curative that are present in the casting compound.

11. The casting compound of claim 1, wherein the epoxy resin contains on average more than one epoxide group per molecule, of which at least one is in the form of an aminoglycidyl group, preferably N,N-diglycidylaniline, N,N-di-glycidyltoluidine, N,N,N',N'-tetraglycidyl-1,3-diaminobenzene, N,N,N',N'-tetraglycidyl-1,4-diaminobenzene, N,N,N',N'-tetraglycidylxylylenediamine, N,N,N',N'-tetraglycidyl-4,4'-diaminodiphenylmethane, N,N,N',N'-tetraglycidyl-3,3'-diethyl-4,4'-diaminodiphenylmethane, N,N,N',N'-tetraglycidyl-3,3'-diaminodiphenyl sulfone, N,N'-dimethyl-N,N'-diglycidyl4,4'-diaminodiphenylmethane, N,N,N',N'-tetraglycidyl-α,α-bis(4-amino-phenyl)-p-diisopropylbenzene, and N,N,N',N'-tetraglycidyl-α,α'-bis(3,5-dimethyl-4-aminophenyl)-p-diisopropylbenzene.

12. The casting compound of claim 1, wherein the aminoglycidyl compound corresponds to at least one the following formulae:

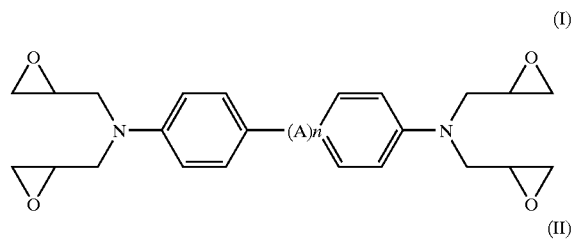

(I)

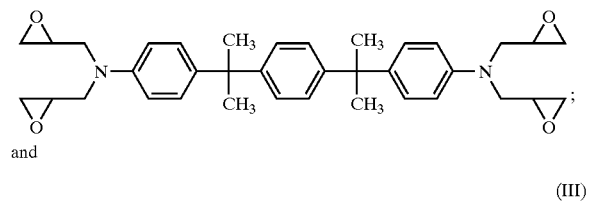

(II)

and

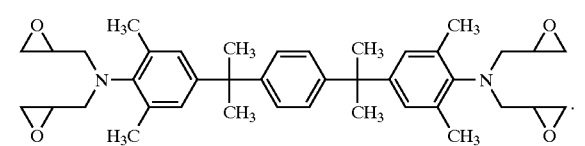

(III)

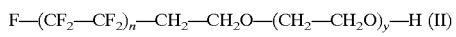

$A = —O—, —S—, —SO_2—, —CO—, —CH_2—, —C(CH_3)_2—,$ n = zero or 1;

13. The casting compound of claim 1, wherein the aminoglycidyl compound is derived from an aminophenol.

14. The casting compound of claim 1, comprising together with the aminoglycidyl compounds other polyepoxides, the fraction of the other polyepoxides in the epoxy resin mixture being between 1 mol % and not more than 75 mol %, preferably between 10 and 50 mol %, and the other polyepoxides preferably being derived from polyhydric phenols, more preferably from bisphenol A, bisphenol F, bisphenol S, from epoxidized phenol or cresol novolacs and/or from cycloaliphatic epoxy resins.

15. The casting compound of claim 1, which comprises as a curative a conventional hydroxyl-containing compound and/or a carboxyl-containing polymer, preferably a carboxyl-terminated polyester and/or carboxyl-containing acrylate and/or methacrylate polymer and/or a carboxylic anhydride, preferably a carboxylic anhydride.

16. The casting compound of claim 15, which comprises the carboxylic anhydride curing agent used in concentrations in the range from 0.2 to 1.2 equivalents of the anhydride groups per epoxide equivalent.

17. The casting compound of claim 1, which comprises as a curative a cyclic anhydride of aromatic, aliphatic, cycloaliphatic, and heterocyclic polycarboxylic acids, preferably at least one anhydride of an aromatic polycarboxylic acid, more preferably phthalic anhydride and/or a substituted derivative of phthalic anhydride.

18. The casting compound of claim 17, which comprises as a curative benzene-1,2,4,5-tetracarboxylic dianhydride and its substituted derivatives, and/or compounds of the formula (IV), and/or an aromatic carboxylic anhydride with fused ring systems, preferably carboxylic anhydride or naphthalenctetracarboxylic dianhydride:

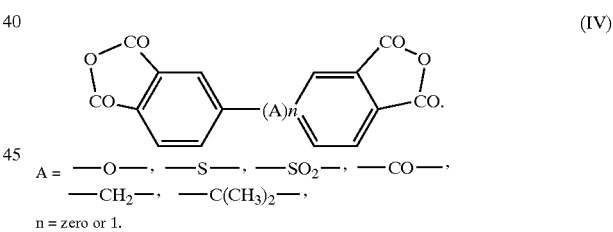

(IV)

$A = —O—, —S—, —SO_2—, —CO—, —CH_2—, —C(CH_3)_2—,$ n = zero or 1.

19. The casting compound of claim 17, which further comprises additives, preferably plasticizers, elasticizers, fillers, reinforcing fibers, flame retardants and/or colorants.

20. The casting compound of claim 1, wherein: x denotes an integer from 2–10, preferably from 3–8, and most preferably from 3–5; and y denotes zero or an integer from 1 to 6, preferably zero, 1, 2, 3, or 4.

21. A method of producing a material, said material selected from the group consisting of a coating, an adhesive, a matrix for a fiber reinforced plastic, and a construction component; wherein the method comprises: providing the casting compound of claim 1, and curing the casting compound at a temperature of 50° C. to 150° C.

22. The material produced by the method of claim 21.

23. A process for preparing the casting compound of claim 1, comprising mixing the epoxy resin, the curative, the fluorosurfactant, and any additives present, in any order, preferably by premixing component (iii) with one or both components (i) and (ii) and subsequently preparing the finished mixture or casting compound.

24. A method of producing an insulating material for the electrical engineering field, comprising providing the casting compound of claim 1, and curing the casting compound at a temperature of 50° C. to 150° C.

25. An electrical component made from materials, said materials comprising the insulating material produced by the method of claim 24, wherein said electrical component is in the form of an electrical insulating system.

26. A material selected from the group consisting of a coating, an adhesive, a matrix for a fiber reinforced plastic, and a construction component; wherein said material is made from the casting compound of claim 1.

27. An electrical component made from materials, the materials comprising the casting compound of claim 1 used as a construction material or an insulation material.

28. The electrical component of claim 27, wherein the electrical component is in the form of: a switchgear component; an electrical insulating system; a measuring transducer; a bushing; a power switch; a dry-type transformer, electrical machinery; a power electronics component; a microelectronics component; an automation engineering component; a semiconductor element coated with said casting compound; or an electronic component impregnated with said casting compound.

29. The electrical component of claim 28, wherein the electrical insulating system comprises an insulating material provided in the form of a rod, combination, or bell type insulator, for pin insulators.

* * * * *